(12) United States Patent
Glock et al.

(10) Patent No.: US 10,196,159 B2
(45) Date of Patent: Feb. 5, 2019

(54) FILLING NEEDLE FOR FILLING A CONTAINER WITH A FLUID

(71) Applicant: Groninger GmbH & Co. KG, Schnelldorf (DE)

(72) Inventors: Ralf Glock, Rudolfsberg (DE); Johannes Schuhmacher, Mulfingen (DE)

(73) Assignee: Groninger GmbH & Co. KG, Schnelldorf (DE)

( * ) Notice: Subject to any disclaimer, the term of this patent is extended or adjusted under 35 U.S.C. 154(b) by 153 days.

(21) Appl. No.: 15/343,056

(22) Filed: Nov. 3, 2016

(65) Prior Publication Data
US 2017/0050753 A1    Feb. 23, 2017

Related U.S. Application Data

(63) Continuation of application No. PCT/EP2015/059981, filed on May 6, 2015.

(30) Foreign Application Priority Data

May 9, 2014  (DE) ......................... 10 2014 106 582

(51) Int. Cl.
*B65B 3/04* (2006.01)
*B65B 39/00* (2006.01)
(Continued)

(52) U.S. Cl.
CPC ................. *B65B 3/04* (2013.01); *A61J 1/201* (2015.05); *B65B 3/003* (2013.01); *B65B 3/26* (2013.01);
(Continued)

(58) Field of Classification Search
CPC .. B65B 3/00; B65B 3/003; B65B 3/04; B65B 3/26; B65B 39/001; B65B 39/004; B65B 39/12; A61J 1/201; F16K 31/086
See application file for complete search history.

(56) References Cited

U.S. PATENT DOCUMENTS 4,757,847 A * 7/1988 Jorss ......................... B67C 3/26
                                                            141/198
5,294,022 A * 3/1994 Earle .................... B67D 3/0003
                                                            141/114
(Continued)

FOREIGN PATENT DOCUMENTS

DE         159841 A1    4/1983
DE        3227616 A1    1/1984
(Continued)

OTHER PUBLICATIONS

German Office Action for Application No. 102014106582.4 dated Jan. 23, 2015, 7 pages.
(Continued)

*Primary Examiner* — Nicolas A Arnett
(74) *Attorney, Agent, or Firm* — Reising Ethington, P.C.

(57) ABSTRACT

A filling needle for filling a container with a fluid, in particular a pharmaceutical or cosmetic fluid, having a housing that extends along a longitudinal axis and has an inlet opening and an outlet opening, having a core element arranged within the housing so as to be displaceable between an opening position and a closure position, having a plunger element coupled to the core element that closes and opens the outlet opening, and having an actuating arrangement for the displacement of the core element between the opening position and the closure position. The core element has at least one core magnet, wherein the actuating arrangement is arranged outside the housing and has at least one actuating magnet, and wherein core actuating magnets are arranged (Continued)

such that they interact with an attractive action and the core element and the actuating arrangement are displaceable jointly parallel to the longitudinal axis.

15 Claims, 5 Drawing Sheets

(51) Int. Cl.
    *B65B 39/12*     (2006.01)
    *B65B 3/00*     (2006.01)
    *B65B 3/26*     (2006.01)
    *F16K 31/08*     (2006.01)
    *A61J 1/20*     (2006.01)

(52) U.S. Cl.
    CPC ............ *B65B 39/004* (2013.01); *B65B 39/12* (2013.01); *F16K 31/086* (2013.01)

(56) References Cited

U.S. PATENT DOCUMENTS

| | | | |
|---|---|---|---|
| 5,450,877 A | 9/1995 | Graffin | |
| 6,161,722 A * | 12/2000 | Sooudi | B05C 5/0279 222/1 |
| 6,810,931 B2 * | 11/2004 | Graffin | B67C 3/26 141/301 |
| 7,717,396 B2 * | 5/2010 | Graffin | H01F 7/0242 251/65 |
| 7,726,524 B2 * | 6/2010 | Merabet | F16K 31/086 222/504 |
| 2002/0017324 A1 | 2/2002 | Hisamura | |
| 2003/0196721 A1 * | 10/2003 | Graffin | B67C 3/26 141/302 |
| 2006/0261300 A1 | 11/2006 | Merabet | |
| 2008/0211323 A1 * | 9/2008 | Graffin | F16K 31/086 310/12.25 |
| 2011/0088813 A1 * | 4/2011 | Graffin | B65B 39/004 141/301 |
| 2017/0130860 A1 * | 5/2017 | Bandini | F16K 31/086 |

FOREIGN PATENT DOCUMENTS

| | | |
|---|---|---|
| DE | 3900955 A1 | 7/1990 |
| DE | 9015711 U1 | 2/1991 |
| DE | 9207051 U1 | 9/1992 |
| DE | 4227980 A1 | 3/1994 |
| DE | 69025466 T2 | 10/1996 |
| DE | 19716980 A1 | 10/1998 |
| DE | 10128404 A1 | 2/2002 |
| DE | 102006019518 A1 | 1/2007 |
| DE | 102010030175 A1 | 12/2011 |
| DE | 102012206262 A1 | 10/2013 |
| EP | 0436214 B1 | 12/1990 |
| EP | 1985900 A2 | 10/2008 |
| JP | 2001012644 A | 1/2001 |
| WO | WO9208919 A1 | 5/1992 |
| WO | WO2013057695 A1 | 4/2013 |

OTHER PUBLICATIONS

English Translation of German Office Action for Application No. 102014106582.4 dated Jan. 23, 2015, 7 pages.
International Search Report for Application No. PCT/EP2015/059981 dated Jul. 7, 2015, 11 pages.
English Translation of International Preliminary Report on Patentability and Written Opinion for Application No. PCT/EP2015/059981 dated Nov. 24, 2016, 8 pages.
Summons to the Oral Proceedings from the German Patent Office for Application No. 102014106582.4 dated Dec. 12, 2016, 7 pages.
English Translation of Summons to the Oral Proceedings from the German Patent Office for Application No. 102014106582.4, dated Dec. 12, 2016, 5 pages.
Examination Report for EP Application No. 15724531.7 dated Nov. 22 2017, 6 pages.
English Translation of Examination Report for EP Application No. 15724531.7 dated Nov. 22 2017, 11 pages.

* cited by examiner

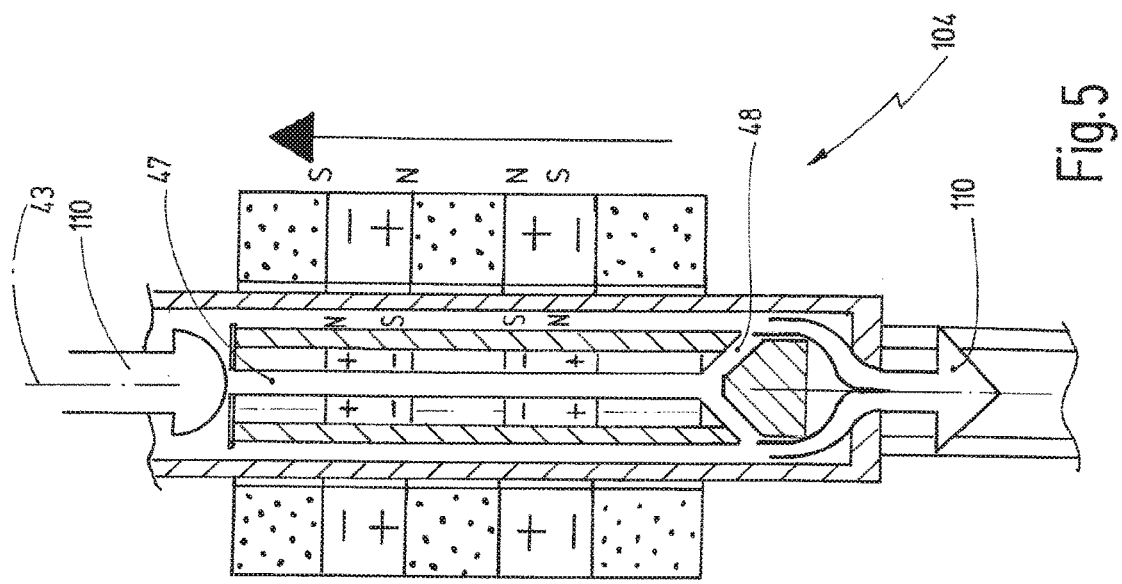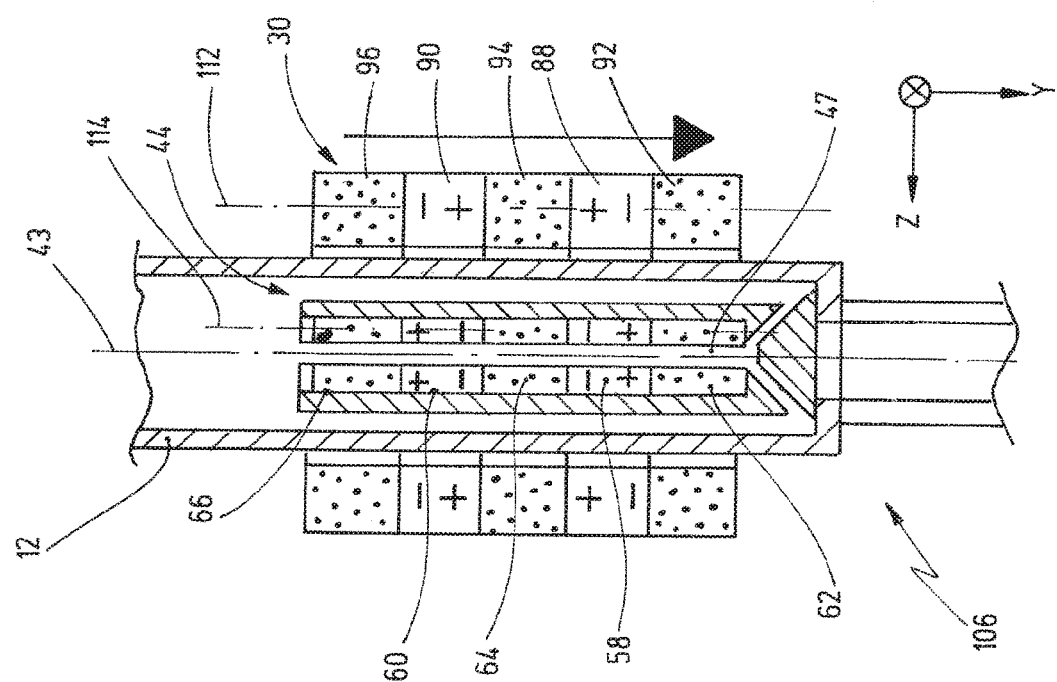
Fig.5

FILLING NEEDLE FOR FILLING A CONTAINER WITH A FLUID

CROSS-REFERENCE TO RELATED APPLICATIONS

This application is a continuation of international patent application PCT/EP2015/059981, filed on May 6, 2015, which claims the priority of German patent application DE 10 2014 106 582.4, filed May 9, 2014, the whole contents of these applications are hereby included by reference.

FIELD

The present invention relates to a filling needle for filling a container with a fluid, in particular a pharmaceutical or cosmetic fluid, having a housing, wherein the housing extends along a longitudinal axis and has an inlet opening and an outlet opening, having a core element which is arranged within the housing so as to be displaceable parallel to the longitudinal axis between an opening position and a closure position, having a plunger element which is coupled to the core element, in particular connected to the core element and displaceable together with the core element, wherein the plunger element closes the outlet opening in the closure position and opens up the outlet opening in the opening position, and having an actuating arrangement for the displacement of the core element between the opening position and the closure position.

BACKGROUND

Filling needles are used for example for filling containers with fluids for pharmaceutical or cosmetic use. In particular, the filling needles are for this purpose firstly introduced through an opening into an interior space of the container, and, during the filling process, are preferably gradually retracted out of the container in order to permit filling of the container even through small openings and without spray losses.

In filling installations, it is possible, for this purpose, for one or more filling needles to be provided in order to fill a corresponding number of containers simultaneously.

An example of a device and a method for filling containers is presented by document DE 10 2006 019 518 A1. The document proposes a device and a method for filling containers, which device has at least one filling device which, by way of a filling needle, supplies liquid to at least one container to be filled, wherein the filling needle is used to completely fill the container. Furthermore, it is sought to provide a drive device which moves the filling needle during the filling process.

Furthermore, for example, document DE 42 27 980 A1 presents a device for dosing a medium into a container from at least one nozzle or the like which is connected via at least one line to a dosing device which is connected to a storage container. Here, it is the intention for the nozzle to travel along with the container during the dosing process in a manner dependent on the activity of a conveying device.

Furthermore, document DE 92 07 051 U1 presents a device for introducing liquids of relatively high viscosity into a storage container for the liquid, from which storage container a line leads to a pump which opens into a filler neck. Here, it is the intention for a shut-off valve to be connected into the line upstream of the filler neck, wherein the shut-off valve is intended to be a solenoid valve, the opening duration of which is variable. It is the intention for the solenoid valve to be actuated by way of an adjustable timing relay.

Thus, in general, solenoid valves are proposed for shutting off or opening up lines in an actuable manner. The solenoid valves are in this case always arranged between a storage container and a filling device. Further such solenoid valves that are generally arranged in fluid circuits are presented for example by the documents DE 32 27 616 A1 and DD 15 98 41 A1.

A plunger may be provided which closes off or opens up an outlet opening of a filling needle in order to precisely dose the liquid quantities with which filling is to be performed. Since the plunger element is arranged directly at the outlet end, it is thus possible to prevent follow-on running or dripping of liquid quantities. In filling needles, however, it is simultaneously the case that only a small structural space is available at the outlet end, such that actuating elements for moving the plunger element must be provided remote from the outlet opening. In the prior art, these are actuators which are coupled to the plunger by way of a bar element which extends in the interior of the filling needle and parallel to the longitudinal axis thereof. The actuators are sealed off with respect to the fluid chamber by way of seal packs. Nevertheless, the filling needles must be cleaned at certain intervals in order to be able to reliably adhere to requirements that may exist with regard to clean space conditions. For this purpose, the filling installations must be stopped, and all of the filling needles must be dismounted and cleaned. Correspondingly, the cleaning of the filling needles is, owing to the downtime of the entire installation, associated with a relatively high cost outlay.

For example, from documents DE 10 2010 030 175 A1 and DE 10 2012 206 262 A1 nozzle needles for the injection of fuel are known, in the case of which a solenoid armature arrangement is moved by way of a selectively energized coil. This however necessitates a supply of electrical current to a nozzle needle of said type, and may necessitate mechanically relatively cumbersome arrangements with spring packs which preload the nozzle needle into a closed state in order to ensure reliable operation.

There is therefore a demand for an improved filling needle for filling a container, which filling needle requires less outlay for cleaning and maintenance and, at the same time, maintains a simple construction.

SUMMARY

According to one aspect of the present design, it is therefore provided a filling needle for filling a container with a fluid, the filling needle having a housing, wherein the housing extends along a longitudinal axis and has an inlet opening and an outlet opening, having a core element which is arranged within the housing so as to be displaceable parallel to the longitudinal axis between an opening position and a closure position, having a plunger element which is coupled to the core element, wherein the plunger element closes the outlet opening in the closure position and opens up the outlet opening in the opening position, and having an actuating arrangement for the displacement of the core element between the opening position and the closure position, wherein the core element has at least one core magnet in the form of a permanent magnet, wherein the actuating arrangement is arranged outside the housing and has at least one actuating magnet in the form of a permanent magnet, and wherein the at least one core magnet and the at least one actuating magnet are arranged such that they interact with an attractive action and the core element and the actuating arrangement are displaceable jointly parallel to the longitudinal axis.

In this way, it is possible for the core element to be actuated and displaced parallel to the longitudinal axis of the housing without an aperture through the housing, and thus an intervention into the clean space situated therein, being necessary. In this way, the possibility of contamination of the clean space by the actuating arrangement is reliably avoided. Seal packs which seal off the actuating arrangement with respect to the clean space no longer need to be provided. It is therefore not possible for the fluid or the clean space within the housing to be contaminated. The at least one actuating magnet and the at least one core magnet are arranged so as to interact with an attractive action. This means that a magnetic coupling of the core element to the actuating arrangement is provided. The field lines of the magnetic field formed by the actuating magnet and the core magnet act through the housing. A displacement of the actuating arrangement parallel to the longitudinal axis along the housing positively leads, owing to the magnetic coupling, to the core element being moved to the same extent parallel to the longitudinal axis. In this way, it is possible for actuation of the core element and of the plunger element that is coupled, in particular connected, thereto to be realized without apertures through the housing. The core element is coupled, in particular connected, to the plunger element. This means that an actuation of the core element between the opening position and the closure position likewise effects an actuation of the plunger element between an opening position and a closure position. In particular if the plunger element is connected to the core element, the plunger element is displaceable jointly with the core element parallel to the longitudinal axis of the housing.

The position of the longitudinal axis always emerges in an obvious manner from the geometry of the filling needle. The filling needle always has, adjoining the outlet opening, an elongate section by way of which the filling needle is introduced into containers to be filled. The longitudinal axis of the filling needle correspondingly runs parallel to said longitudinal extent.

It is furthermore possible for the actuating arrangement to be actuated in a manner known from the prior art, for example by way of pneumatic drive devices. Since the coupling is realized by way of permanent magnets, no additional energization of any coils, or electrical supply, is necessary. This makes it possible for the filling installation machine concept surrounding the filling needle to be maintained unchanged. In particular, this also makes it possible for existing filling needles to be replaced with the improved filling needles proposed in this application, without the need for a redesign of the filling installation.

Furthermore, a filling installation having at least one filling needle according to the embodiment mentioned above, or one of the refinements thereof, is provided. A filling installation of said type can thus be serviced more quickly and more cost-effectively, and provides substantially the same advantages.

In one refinement of the filling needle, it may be provided that the actuating arrangement is of sleeve-like form, wherein the sleeve-like actuating arrangement surrounds an axial section of the housing.

By way of the sleeve-like design of the actuating arrangement, it is possible to provide reliable guidance on the housing. At the same time, the arrangement of the actuating magnets directly on the housing makes it possible for efficiency losses owing to an air gap to be minimized.

In a further refinement of the filling needle, it may be provided that the at least one actuating element is of ring-shaped form and surrounds the housing.

In this way, it is possible to provide a symmetrical configuration of the magnetic fields and a high magnetic force, which securely couples the actuating arrangement and the core element.

In a further refinement of the filling needle, it may be provided that the core element has multiple core magnets, wherein the actuating arrangement has multiple actuating magnets, and wherein a number of the actuating magnets and a number of the core magnets are identical.

In this way, it may be possible for the magnetic field that couples the core element and the actuating arrangement to be coupled over a relatively long region of the axial section. Both the core element and the actuating arrangement may extend over a relatively long axial section. In order for the coupling magnetic field to also correspondingly extend over said axial section, it is consequently possible for a multitude of core magnets and a multitude of actuating magnets to be provided. The identical number consequently has the effect that in each case one core magnet is assigned to one particular actuating magnet.

In a further refinement of the filling needle, it may be provided that the core element has a multitude of core ring elements, wherein each core ring element is formed from at least one paramagnetic and/or ferromagnetic material, and wherein the multitude of core ring elements and the at least one core magnet are arranged in alternating fashion in an axial direction, and that the actuating arrangement has a multitude of actuating ring elements, wherein each actuating ring element is formed from at least one paramagnetic and/or ferromagnetic magnet, and wherein the multitude of actuating ring elements and the at least one actuating magnet are arranged in alternating fashion in an axial direction.

In particular, the material for the at least one core magnet and/or the at least one actuating magnet may be iron or a ferrite such as for example iron oxide or some other metal oxide. It is however preferably a ferromagnetic material.

In this way, the magnetic fields of the at least one core magnet of the at least one actuating magnet can be greatly intensified. In practice, it has been found that, by way of an alternating construction of magnets and ferromagnetic ring elements, it is possible to provide particularly good magnetic coupling of actuating arrangement and core element.

Normally, materials with a magnetic permeability of greater than 1 are referred to as being paramagnetic. Materials whose magnetic permeability is very much greater than 1 are classified as ferromagnetic materials, because the magnetic moments of the ferromagnet align themselves parallel to an external magnetic field and intensify the latter. It is basically also the case that ferromagnetic and antiferromagnetic substances have a magnetic alignment and may be used instead of a ferromagnetic material, in particular numerous oxides of ferromagnetic elements such as iron, nickel and cobalt. It is however preferable for ferromagnetic materials to be used.

In a further refinement of the filling needle, it may be provided that the core element has an even number of core magnets and an odd number of core ring elements, and that the actuating arrangement has an even number of actuating magnets and an odd number of actuating ring elements.

In this way, the core ring elements or actuating ring elements are arranged "at the outside" or at the ends of the alternating sequence of ring elements and magnets. In this way, the magnetic field of the magnets can be intensified in a particularly suitable manner, and the axial structural space can be utilized in an effective manner.

In particular, in one refinement, it may be provided that the core element has two core magnets and three core ring elements, such that the actuating arrangement has two actuating magnets and three actuating ring elements.

It has been found that, with this arrangement, the magnetic fields of the two core magnets or two actuating magnets can be adequately intensified with effective utilization of the axial structural space, and secure coupling of core element and actuating arrangement is provided.

In a further refinement of the filling needle, it may be provided that a pole axis of the at least one core magnet and a pole axis of the at least one actuating magnet are arranged parallel to the longitudinal axis of the housing, wherein the pole axis of the at least one core magnet and the pole axis of the at least one actuating magnet are of opposite polarity.

In particular, by way of the ring-shaped design of the at least one actuating magnet, an effective provision of an intense magnetic field is made possible if the pole axes are oriented not perpendicular to the longitudinal axis but parallel to the longitudinal axis of the filling needle. The same may apply correspondingly to the at least one core magnet. By way of the opposite polarity of in each case one actuating magnet and one associated core magnet, the attractive forces required for the magnetic coupling are provided.

In one refinement of the filling needle, it may be provided that the core element has an internal cutout in order to provide a fluidic connection between the inlet opening and the outlet opening in the opening position.

This permits guidance of the core element by way of its outer circumference on an inner circumference of the housing. The fluid then passes through the internal cutout through the core element in a longitudinal direction. At the same time, this permits the arrangement of the core magnets in a shell of the core element of substantially sleeve-shaped form.

In a further refinement, it may be provided that the at least one core magnet is of ring-shaped form and surrounds the internal cutout.

In this way, the at least one core magnet is likewise provided in ring-shaped form, whereby, in particular in interaction with the orientation of the pole axes parallel to the longitudinal axis, particularly intense interaction between the at least one core magnet and the at least one actuating magnet is realized.

In particular if both the at least one core magnet and the at least one actuating magnet are of ring-shaped form and are arranged coaxially with respect to one another, the axes of the most intense magnetic actions coincide with the longitudinal axis. The longitudinal axis then coincides with the axes of rotational symmetry of the at least one core magnet and of the at least one actuating magnet. Consequently, particularly intense coupling by way of the magnetic fields of the at least one actuating magnet and of the at least one core magnet is realized.

In a further refinement of the filling needle, it may be provided that the actuating arrangement has a first actuating magnet and a second actuating magnet, wherein the pole axes of the actuating magnets run parallel to the longitudinal axis, and wherein the first actuating magnet and the second actuating magnet are of opposite polarity, wherein the core element has a first core magnet which is assigned to the first actuating magnet and which is of opposite polarity with respect to said first actuating magnet, and wherein the core element has a second core magnet which is assigned to the second actuating magnet and which is of opposite polarity with respect to said second actuating magnet.

In this way, it is possible overall to provide a magnetically attractive arrangement in which, in turn, the first actuating magnet and the first core magnet and also the second actuating magnet and the second core magnet together form a magnetic field in the manner of a quadrupole. In this way, it is possible for particularly effective coupling between the core element and actuating element to be provided, in particular because the magnetic field lines between the first core magnet and second core magnet and between the first actuating magnet and second actuating magnet run through the housing approximately perpendicularly to the longitudinal axis.

In one refinement of the filling needle, it may be provided that the plunger element is a plunger element which closes off the outlet opening at the inside or a plunger element which closes off the outlet opening at the outside.

It is thus basically possible for the plunger element to be provided as a plunger element which imparts a closing action at the inside or at the outside. Only the opening position and the closure position change in a manner dependent on this configuration. Whereas, in the case of the plunger element which imparts a closing action at the inside, a position of the core element close to the outlet opening forms the closure position and a position of the core element further remote from the outlet opening forms an opening position, this behavior is exactly reversed in the case of a plunger element which imparts a closing action at the outside.

In the refinement of the filling needle, it may be provided that the actuating arrangement is pneumatically, hydraulically or electrically driven. It is preferably provided that the actuating arrangement is pneumatically driven because, in general, a pneumatic arrangement is provided in any case for the operation of a filling installation, in particular for the movement of the entire filling needle into and out of a container, and thus a compressed-air source is present. It is self-evidently basically also possible for other types of drive to be provided.

In a further refinement, it may be provided that the actuating arrangement is driven by way of a lever device.

It may thus be provided that, for example, an actuator is articulated directly on the actuating arrangement, or else is articulated on the actuating arrangement by way of a lever device. Depending on the forces to be imparted and the available movement travels, the force that is exerted on the actuating arrangement for the displacement thereof may be suitably set by way of the lever device.

In one refinement of the filling needle, it may be provided that the core has an inner element and an outer element which, between them, form an intermediate space, wherein the at least one core magnet is arranged in the intermediate space.

In this way, it is made possible for the core element to be provided by way of a pressed connection of the inner element to the outer element. Then, in the intermediate space formed in between, the at least one core magnet is pressed in and held. This may permit manufacture of the core element without welding processes or other heat-imparting processes, which may possibly impair the magnetic characteristics of the at least one core magnet.

It is self-evident that the features mentioned above and the features yet to be discussed below may be used not only in the respectively specified combination but also in other combinations or individually, without departing from the scope of the present invention.

BRIEF DESCRIPTION OF THE DRAWINGS

Embodiments of the invention are illustrated in the drawing and will be discussed in more detail in the following description, in which:

FIG. 5 shows an example of an arrangement of core magnets and actuating magnets and of the corresponding polarity thereof.

DESCRIPTION

Figure 1:
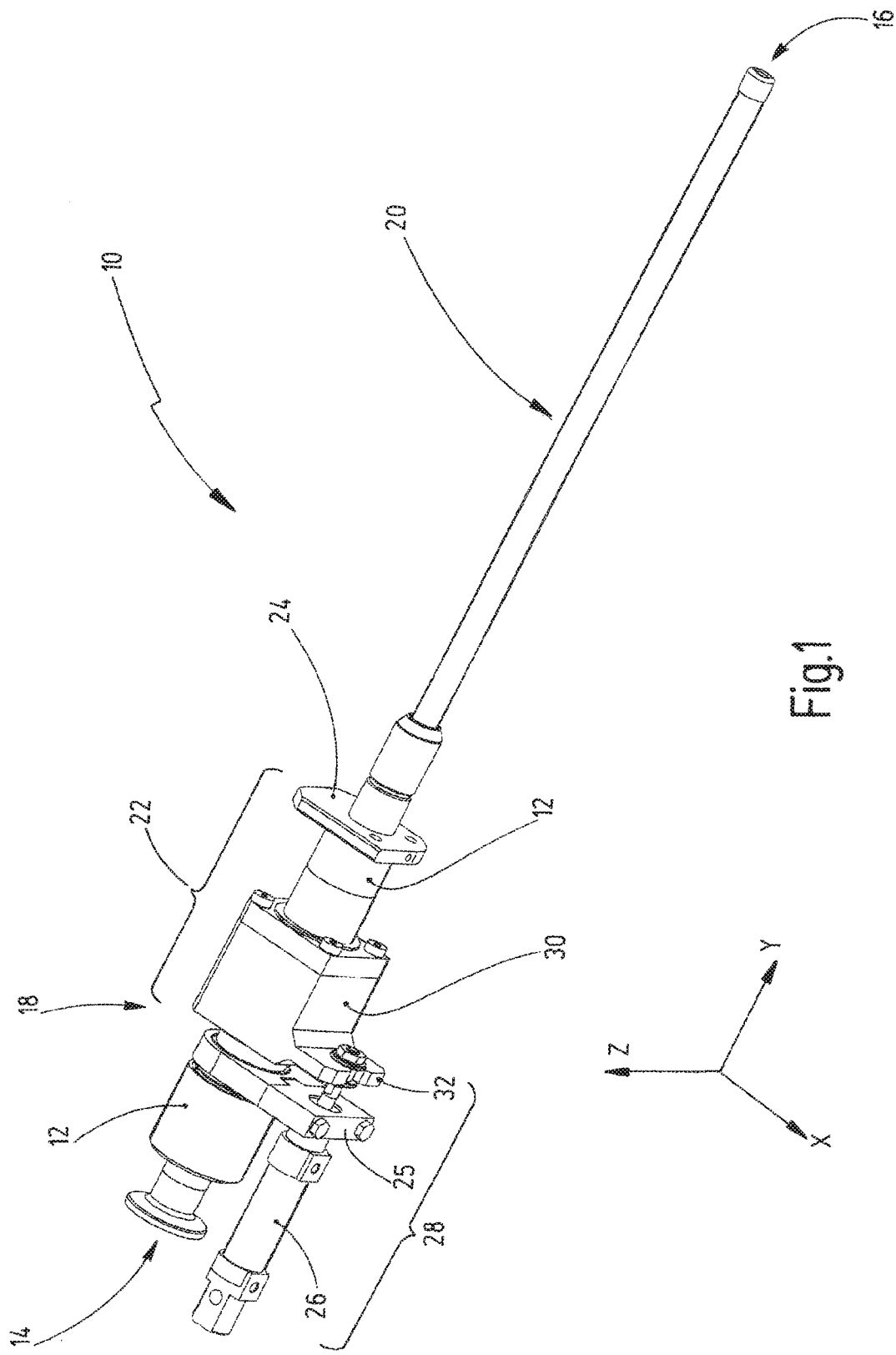
FIG. 1 shows an isometric view of an embodiment of a filling needle.

FIG. 1 shows an embodiment of a filling needle 10. The filling needle 10 has a housing 12. The housing 12 extends between an inlet opening 14 and an outlet opening 16. The housing 12 has, close to the inlet opening, a first housing region 18. Said first housing region 18 is also referred to as filling pipe. Furthermore, the housing 12 has a second housing region 20. The second housing region 20 may also be referred to as needle housing.

In the embodiment illustrated, the first housing region 18 and the second housing region 20 are formed from one piece. It is however basically also possible, for example, for the housing 12 to be formed from two parts, in particular the first housing region 18 and the second housing region 20 in a separate configuration. The first housing region 18 has an axial section 22. Said axial section 22 of the first housing region 18 serves, at its outer surface, as a guide for an actuating arrangement 30. At its inner surface, said axial section serves as a guide for a core element that will be described in more detail below.

Furthermore, a fastening flange 24 is arranged on the housing 12; by way of said fastening flange 24, the filling needle 10 can be mounted for example on a filling installation.

In the embodiment illustrated, the filling needle 10 has a pneumatic cylinder 26. Said pneumatic cylinder is part of a drive device 28 which can displace the actuating arrangement 30 parallel to a longitudinal extent of the filling needle (in the Y direction in FIG. 1). Other drive devices are however basically also possible, for example a hydraulic drive device or an electric drive device which, in a desired manner, permit a translational movement of the actuating arrangement 30. For the guidance of an actuating cylinder of the pneumatic cylinder 26, a guide flange 25 is provided which supports the movement of the pneumatic cylinder 26 in the X-Z plane. The actuating arrangement 30 can thus be displaced by activation of the pneumatic cylinder 26. The pneumatic cylinder 26 engages with a driving flange 32 provided on the actuating arrangement 30. In this way, the pneumatic cylinder 26 and the actuating arrangement 30 are coupled to one another in the Y direction. An actuation of the pneumatic cylinder 26 can then displace the actuating arrangement parallel to the Y direction. The actuating arrangement preferably has an aluminum housing. The actuating arrangement 30 is preferably guided on an outer surface of the axial section 22 by way of two plastics slide bushings.

Figure 2:
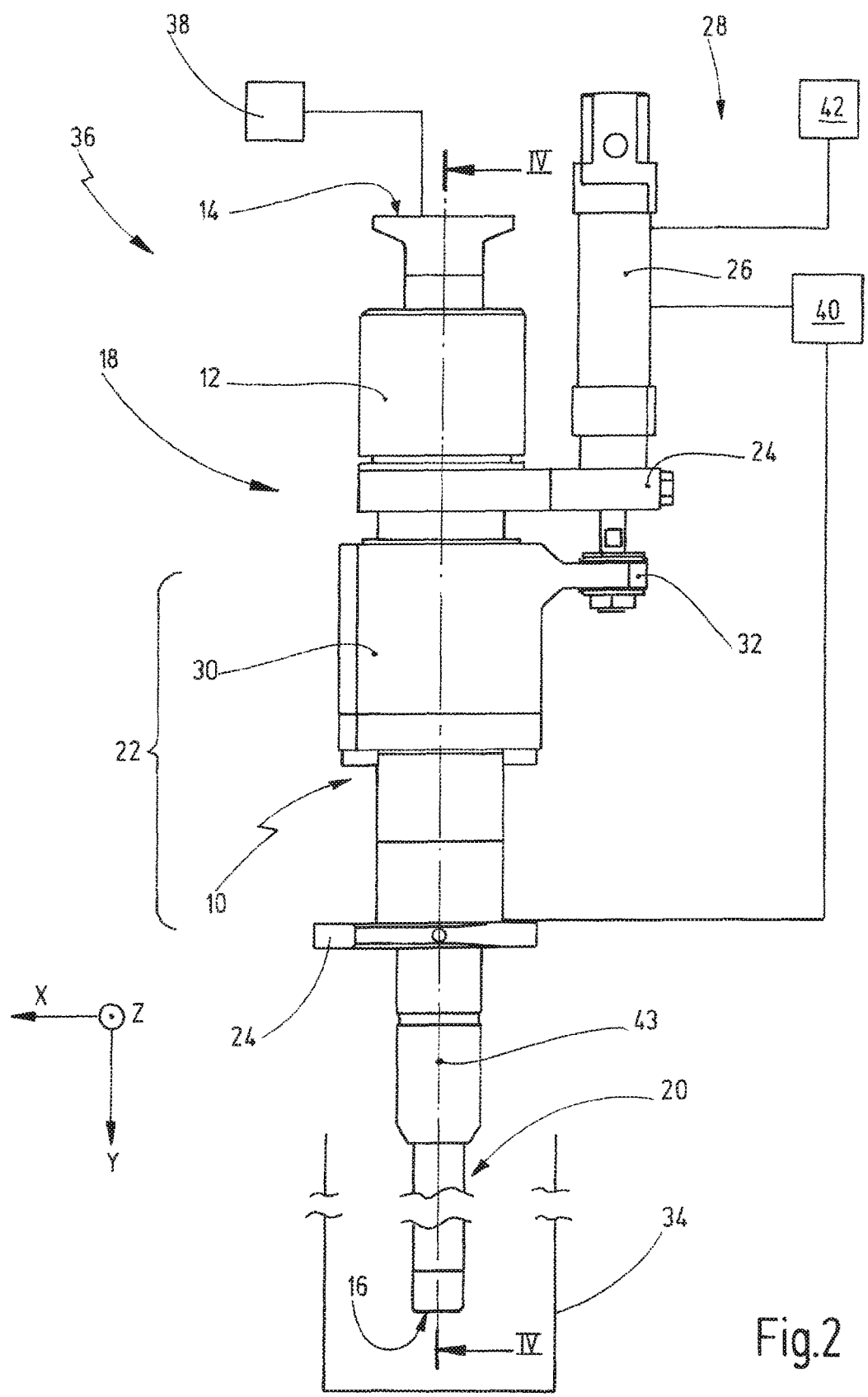
FIG. 2 shows a side view of the filling needle in FIG. 1.

FIG. 2 shows a side view of the filling needle 10 in the context of the outer surroundings of a filling installation 36. The filling needle 10 serves for filling a schematically illustrated container 34 with a fluid. For this purpose, it may be provided that the filling needle 10 can be inserted into and removed from the container 34 parallel to the Y direction. This however need not imperatively be the case. The fluid is supplied to the inlet opening 14 of the filling needle 10 from a reservoir 38. This is realized in the conventional manner. A regulating device 40 of the filling installation 36 serves for actuating the filling needle 10, in particular a movement of the entire filling needle 10 parallel to the Y direction, and for actuating the pneumatic cylinder 26. Now, it is for example possible for a compressed-air source 42 of the filling installation to be provided for the purposes of providing the drive device 28 and for the purposes of actuating the pneumatic cylinder 26 in a manner controlled by the regulating device 40.

All other elements are denoted by the same reference designations and will therefore not be discussed again.

Likewise illustrated in FIG. 2 is a longitudinal axis 43 of the filling needle 10, which runs along the longitudinal extent of the housing 12. In the embodiment illustrated, the longitudinal axis 43 extends from the inlet opening 14 to the outlet opening 16. In the interior, the housing 12 is of hollow form, such that a fluid can pass through the housing 12 from the inlet opening 14 to the outlet opening 16.

Figure 3:
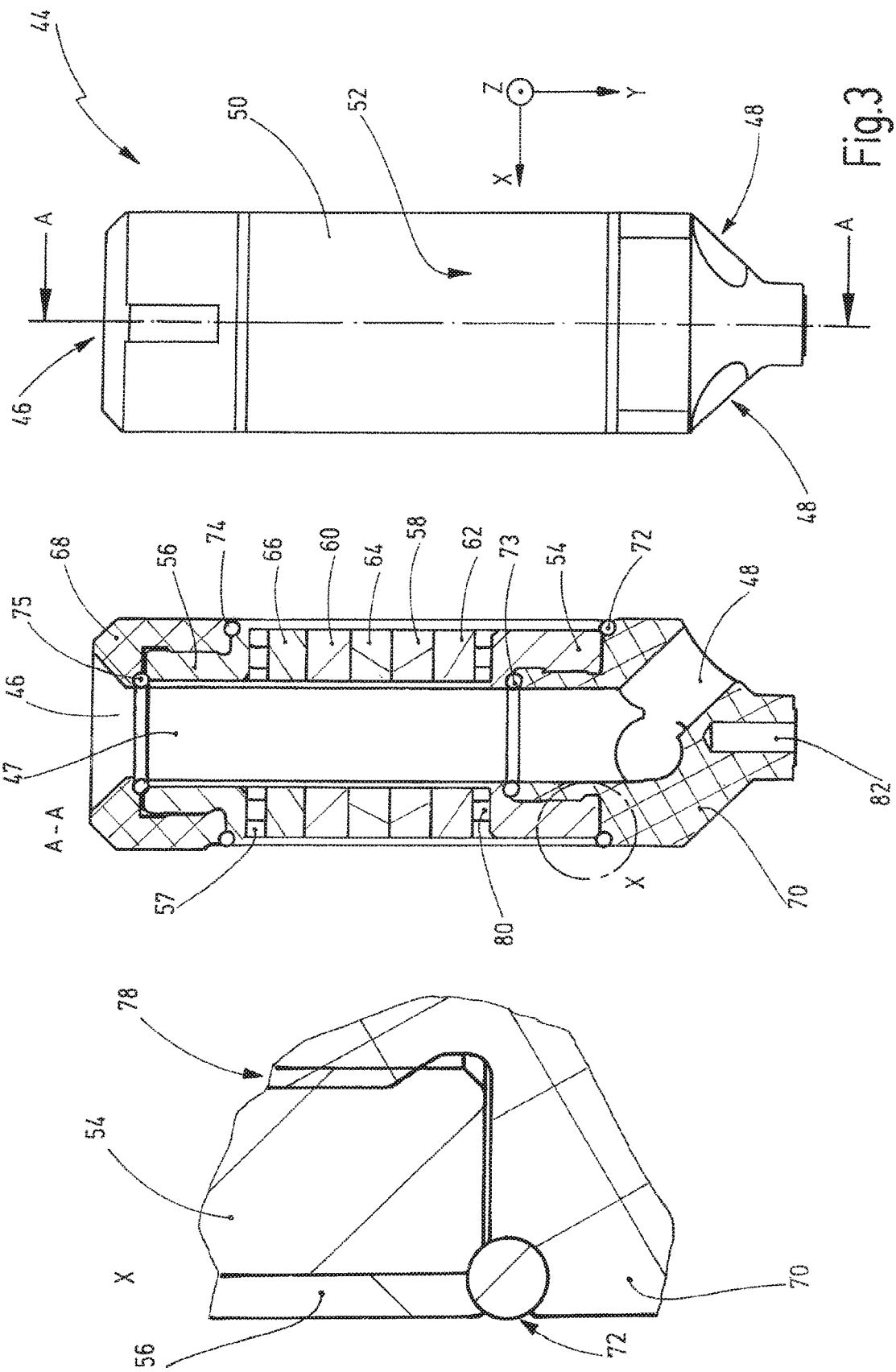
FIG. 3 shows a detail illustration of an embodiment of a core element.

FIG. 3 shows a core element 44. The core element 44 is arranged in the interior of the housing 12, in particular within the first housing region 18. The core element 44 is displaceable in the housing 12 parallel to the longitudinal axis 43, that is to say parallel to the Y direction. The core element 44 has an inlet section 46 into which fluid that has entered the housing 12 through the inlet opening 14 enters the core element 44. Furthermore, said core element has at least one outlet section 48 through which the fluid exits the core element 44 again in the direction of the outlet opening 16. In the embodiment illustrated, the core element 44 has three outlet sections 48, of which two are visible in the view illustrated. The outlet sections 48 are arranged so as to be offset in each case by 120°.

As can be seen from the cross-sectional view A-A in FIG. 3, the inlet section 46 and the at least one outlet section 48 are connected to one another by way of an internal cutout 47. The core element 44 is thus substantially in the form of a sleeve which surrounds the internal cutout 47. The sleeve is denoted by the reference designation 50. By way of an outer side of the sleeve 52, the core element 44 can be guided in displaceable fashion in the housing 12.

The core element 44 has an inner element 54 and an outer element 56. Each of the elements is of substantially Z-shaped form in the cross section of FIG. 8. The inner element 54 and the outer element 56 are of substantially rotationally symmetrical and sleeve-like form. Between them, they form an intermediate space 57. A first core magnet 58 and a second core magnet 60 can be arranged in said intermediate space 57. In the embodiment illustrated, it is furthermore the case that a total of three core ring elements 62, 64, 66 are arranged so as to alternate with the first core magnet 58 and the second core magnet 60 in the Y direction, that is to say parallel to the longitudinal axis 43. Furthermore, spacer rings or spacer pieces 80 may be provided in order to support the core magnets 58, 60 and the core ring elements 62, 64, 66 in the intermediate space 57. Said spacer rings or spacer pieces may be of elastic form in order to suitably support the core magnets 58, 60 and the core ring elements 62, 64, 66 during the formation of a pressed connection of the inner element 54 and outer element 56. Through the manufacture of the pressed connection, it is possible for the core element 44 to be suitably manufactured without the core magnets 58, 60 being impaired owing to excessively high temperatures. The core ring elements 62, 64, 66 are preferably formed from iron or from some other ferromagnetic material. Each of the core magnets 58, 60 and of the core ring elements 62, 64, 66 is of ring-shaped form and surrounds the internal cutout 47. Furthermore, an upper closure element 68 and a lower closure element 70 are provided. The upper closure element 68 is connected to the outer element 56 by way of a pressing action. The lower closure element 70 is connected to the inner element 54 by way of a pressing action. For the in particular pharmaceutical sealing of the internal cutout 47 and thus of the region in which the fluid is conducted, sealing rings 72, 73, 74, 75 are arranged so as to suitably seal off the pressing surfaces. In the enlarged detail X, a corresponding fit 78 for the pressed connection of, for example, the lower closure element 70 to the inner element 54 is indicated. The illustrated arrangement has the advantage that, for example by way of the sealing ring 72, both an area between the inner element 54 and the outer element 56 and also between the element 54 and the lower closure element 70 can be sealed off.

Furthermore, the core element 44 has, in particular in the lower closure element 70, a plunger receptacle 82 by way of which said core element can be connected to the plunger element (not illustrated in FIG. 3). In the embodiment illustrated, the plunger receptacle 82 is a threaded receptacle into which the plunger element can be screwed.

It is also possible for slide bushings to be provided on the core element 44 for the purposes of guiding the core element. Alternatively, it is also possible for a slide coating to be applied in order to guide the core element 44 for the outer side of the sleeve 52. Here, the core magnets 58, 60 should however not be heated above 200° C. so as not to impair their magnetic characteristics. In particular, the upper closure element 68 and the lower closure element 70 may be in the form of slide bushings. In particular, the upper closure element 68 and the lower closure element may be formed from polyether ether ketone (PEEK).

The outer element 56 and the inner element 54 may also be formed from said material. Said material has advantages in particular with regard to its chemical resistance.

Figure 4:
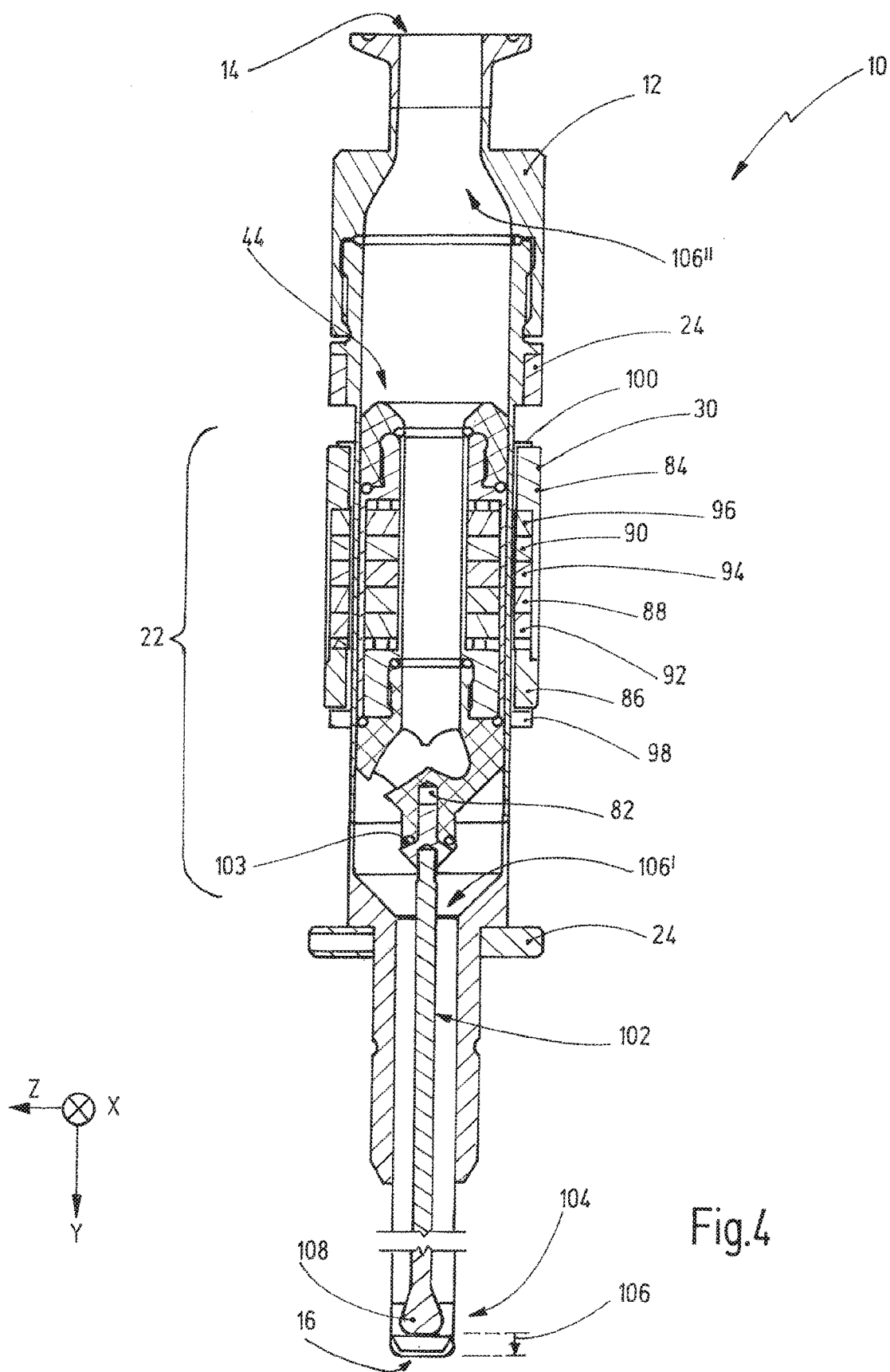
FIG. 4 shows a cross-sectional view along a line IV-IV in FIG. 2.

FIG. 4 shows a cross-sectional view along a line IV-IV in FIG. 2. The core element 44 is designed as illustrated in FIG. 3 and is guided in the axial section 22 of the housing 12.

The actuating arrangement 30 has a first element 84 and a second element 86. The first element 84 substantially functions in the manner of the outer element 56 of the core element 44. The inner element 86 substantially functions in the manner of the inner element 54 of the core element 44. Said first element and inner element may be connected to one another by way of a pressing action and, between them, receive a first actuating magnet 88 and a second actuating magnet 90 in the embodiment illustrated. Furthermore, in the embodiment illustrated, three actuating ring elements 92, 94, 96 are provided. The actuating ring elements 92, 94, 96 are preferably formed from iron or from some other ferromagnetic material. Furthermore, two slide bushings 98 and 100 are provided which guide the actuating arrangement 30 on the housing 12.

A plunger element is denoted by 102 and is screwed into the plunger receptacle 82 of the core element 44. The core element 54 is sealed off on the plunger element 102 by way of a seal 103.

In FIG. 4, the core element 44 and consequently the plunger element 102 are illustrated in an opening position 104. In said position, a plunger head 108 of the plunger element 102 does not close off the outlet opening 16. Now, if the actuating arrangement 30 is moved by way of the drive device 28 in a positive Y direction, that is to say downward in FIG. 4, the core element is driven along in the positive Y direction owing to the magnetic coupling between the core element 44 and the actuating arrangement 30. Consequently, the plunger element 102 also moves in the positive Y direction, such that the plunger head 108 closes off the outlet opening 16, and the arrangement is then situated in a closure position 106. FIG. 4 illustrates the plunger element 102 as a plunger element which imparts a closing action at the inside. Plunger elements which impart a closing action at the outside are self-evidently also conceivable. Then, it is the case that a closure position is situated above, that is to say further in the negative Y direction relative to, the opening position, because a plunger head must then, in effect, be pulled against the outlet opening 16 in order to close off the latter. Furthermore, the closure position 106 need not imperatively be arranged at the outlet opening 16 of the filling needle 10. Other arrangements of the plunger element 102 between the reservoir 38 and the outlet opening 16 are basically also possible in order, owing to the coupling of the plunger element 102 to the core element 44, to selectively shut off or permit an outflow of the fluid. A further exemplary arrangement of a closure position 106' on the housing 12 is denoted in FIG. 4. Said further arrangement is situated for example approximately at a start of the second housing region 20 or at the first housing region 18. Further arrangements of the closure position are basically also conceivable. For example, it is also possible for a closure position 106" to be provided above, or upstream of, the core element 44.

FIG. 5 shows a possibility for the arrangement of the core magnets 58, 60 and of the actuating magnets 88, 90. In FIG. 5, the closure position 106 is illustrated on the left, and the corresponding opening position 104 is illustrated on the right.

Negative poles S are denoted by a "minus". Positive poles N are denoted by a "plus".

A fluid 110 illustrated schematically on the basis of arrows, in particular a pharmaceutical or cosmetic fluid, enters the housing 12 through the inlet opening 14 and can flow through the internal cutout 47. In the opening position 4 illustrated on the right, it is thus possible for the fluid to emerge from the core element 44 again through the internal cutout 47 and the outlet sections 48 and ultimately pass into the second housing region 70 in the direction of the outlet opening 16.

FIG. 5 illustrates, by way of example, possibilities for the arrangement of the magnets and their pole axes. As can be seen, the pole axes 112 of the actuating magnets 88, 90 are formed parallel to the Y axis, that is to say parallel to the longitudinal axis 43. The same applies to the pole axes of the core magnets 58, 60, which likewise run parallel to the longitudinal axis 43. The pole axes of the actuating magnets 88, 90 are denoted by 112. The pole axes of the core magnets 58, 60 are denoted by 114. The pole axes 112, 114 are merely schematically indicated. Since the core magnets 58, 60 and actuating magnets 88, 90 are ring-shaped elements, it would also be possible for the pole axes 112, 114 to be shown as being coaxial with the longitudinal axis 43. As can be seen, the poles of the first actuating magnet 88 and of the second actuating magnet 90 are in an opposing configuration. The same applies to the poles of the first core magnet 58 and of the second core magnet 60, which are likewise in an opposing configuration. At the same time, the first actuating magnet 88 is assigned the first core magnet 58. Said magnets are in turn of opposite polarity. The same applies to the second actuating magnet 90 and the second core magnet 60, which are likewise of opposite polarity. The actuating ring elements serve for intensifying the magnetic fields. This yields magnetic field lines which, at least three locations, in each case approximately at the level of the actuating ring elements or core ring elements, run perpendicularly through a wall of the housing 12, such that intense coupling of actuating element 30 and core element 44 is realized. In this way, it is possible in a reliable manner for the core element 44 to be displaced parallel to the longitudinal axis 43 or relative to the Y axis by way of a movement of the actuating arrangement 30.

The invention claimed is:

1. A filling needle for filling a container with a fluid, having a housing, wherein the housing extends along a longitudinal axis and has an inlet opening and an outlet opening, having a core element which is arranged within the housing so as to be displaceable parallel to the longitudinal axis between an opening position and a closure position, having a plunger element which is coupled to the core element, wherein the plunger element closes the outlet opening in the closure position and opens up the outlet opening in the opening position, and having an actuating arrangement for the displacement of the core element between the opening position and the closure position, wherein the core element has at least one core magnet in the form of a permanent magnet, wherein the actuating arrangement is arranged outside the housing and has at least one actuating magnet in the form of a permanent magnet, and wherein the at least one core magnet and the at least one actuating magnet are arranged such that they interact with an attractive action and the core element and the actuating arrangement are displaceable jointly parallel to the longitudinal axis, wherein the core element has an internal cutout in order to provide a fluidic connection between the inlet opening and the outlet opening in the opening position, and wherein the at least one core magnet is of ring-shaped form and surrounds the internal cutout.

2. The filling needle as claimed in claim 1, wherein the actuating arrangement is of sleeve-like form, wherein the sleeve-like actuating arrangement surrounds an axial section of the housing.

3. The filling needle as claimed in claim 1, wherein the at least one actuating magnet is of ring-shaped form and surrounds the housing.

4. The filling needle as claimed in claim 1, wherein the core element has multiple core magnets, wherein the actuating arrangement has multiple actuating magnets, and wherein the number of actuating magnets and core magnets is identical.

5. The filling needle as claimed in claim 1, wherein the core element has a multitude of core ring elements, wherein each core ring element is formed from at least one paramagnetic and/or ferromagnetic material, and wherein the multitude of core ring elements and the at least one core magnet are arranged in alternating fashion in an axial direction, and in that the actuating arrangement has a multitude of actuating ring elements, wherein each actuating ring element is formed from at least one paramagnetic and/or ferromagnetic material, and wherein the multitude of actuating ring elements and the at least one actuating magnet are arranged in alternating fashion in an axial direction.

6. The filling needle as claimed in claim 5, wherein the core element has an even number of core magnets and an odd number of core ring elements, and in that the actuating arrangement has an even number of actuating magnets and an odd number of actuating ring elements.

7. The filling needle as claimed in claim 6, wherein the core element has two core magnets and three core ring elements, and in that the actuating arrangement has two actuating magnets and three actuating ring elements.

8. The filling needle as claimed in claim 1, wherein a pole axis of the at least one core magnet and a pole axis of the at least one actuating magnet are arranged parallel to the longitudinal axis of the housing, wherein the pole axis of the at least one core magnet and the pole axis of the at least one actuating magnet are of opposite polarity.

9. The filling needle as claimed in claim 1, wherein the actuating arrangement has a first actuating magnet and a second actuating magnet, wherein the pole axes of the actuating magnets run parallel to the longitudinal axis, and wherein the first actuating magnet and the second actuating magnet are of opposite polarity, wherein the core element has a first core magnet which is assigned to the first actuating magnet and which is of opposite polarity with respect to said first actuating magnet, and wherein the core element has a second core magnet which is assigned to the second actuating magnet and which is of opposite polarity with respect to said second actuating magnet.

10. The filling needle as claimed in claim 1, wherein the plunger element is a plunger element which closes off the outlet opening at the inside or a plunger element which closes off the outlet opening at the outside.

11. The filling needle as claimed in claim 1, wherein the actuating arrangement is pneumatically, hydraulically or electrically driven.

12. The filling needle as claimed in claim 1, wherein the actuating arrangement is driven by way of a lever device.

13. The filling needle as claimed in claim 1, wherein the core has an inner element and an outer element which, between them, form an intermediate space, wherein the at least one core magnet is arranged in the intermediate space.

14. The filling needle as claimed in claim 1, wherein the fluid is a pharmaceutical or cosmetic fluid.

15. A filling installation having at least one filling needle as claimed in claim 1.

* * * * *